3,580,949
N,N'-BIS-(AMINOALKYL)-BENZYL-AMINES
Vsevolod Gruenman, Montclair, Max Hoffer, Nutley, Jay Philip O'Brien, Irvington, and Albert Israel Rachlin, Verona, N.J., and Gerhard Zbinden, Cambridge, England, assignors to Hoffmann-La Roche Inc., Nutley, N.J.
No Drawing. Original application Mar. 19, 1965, Ser. No. 441,333, now Patent No. 3,382,260, dated May 7, 1968. Divided and this application Nov. 13, 1967, Ser. No. 682,522
Int. Cl. C07c 87/28
U.S. Cl. 260—570.5
2 Claims

ABSTRACT OF THE DISCLOSURE

N,$N^1$ - (iminodialkylene)benezenesulfonamides, N,$N^1$-(alkylenediiminodialkylene)benzenesulfonamides and derivatives thereof, effective against tachycardia and arrhythmia in both auricular and ventricular tissues, are prepared, for example, from an intermediate of the formula $$R_1'-\text{C}_6\text{H}_4-SO_2\overset{R_2}{\underset{|}{N}}-CH_2(CH_2)_{n1}NH_2 \quad \text{VIII}$$

$$R_4'-\text{C}_6\text{H}_4-SO_2\overset{R_2}{\underset{|}{N}}-CH_2(CH_2)_{p1}-X \quad \text{XII}$$

$$R_1'-\text{C}_6\text{H}_4-SO_2\overset{R_2}{\underset{|}{N}}-\overset{R_3}{\underset{\underset{R_3}{|}}{C}}-(CH_2)_n-NH(CH_2)_{m1}NH_2 \quad \text{XV}$$

or $$H_2N-CH_2-(CH_2)_{n_1}-\underset{\underset{CH_2-\text{C}_6\text{H}_5}{|}}{N}-(CH_2)_{p_1}-CH_2-NH_2 \quad \text{XXI}$$

wherein $R_1'$ and $R_4'$ are hydrogen, lower alkyl, protected amino group or amino group precursor; $R_2$ and $R_3$ are hydrogen or lower alkyl; X is chlorine or bromine; $n_1$ and $p_1$ are each 2 or 3; N is from 1 to 3, and $m_1$ is from 2 to 4.

CROSS-REFERENCE TO RELATED APPLICATION

This application is a division of U.S. patent application Ser. No. 441,333, filed Mar. 19, 1965. Now U.S. Pat. No. 3,382,260, May 7, 1968.

BRIEF SUMMARY OF THE INVENTION

The invention relates to compounds of the formula $$H_2N-CH_2-(CH_2)_{n_1}-\underset{\underset{CH_2-\text{C}_6\text{H}_5}{|}}{N}-(CH_2)_{p_1}-CH_2-NH_2 \quad \text{XXI}$$

wherein $n_1$ and $p_1$ are whole numbers from 2 to 3.

The compounds of Formula XXI are useful as intermediates for the hereinafter described compounds of Formula XVII.

In another aspect, the invention relates to compounds of the formula $$N\equiv C-(CH_2)_{n_1}N-(CH_2)_{p_1}-C\equiv N$$
$$\underset{CH_2-\text{C}_6\text{H}_5}{|} \quad \text{XX}$$

wherein $n_1$ and $p_1$ are from 2 to 3.

The compounds of Formula XX are useful intermediates for the compounds of Formula XXI.

DETAILED DESCRIPTION

This invention relates to novel sulfonamides and to processes for their preparation. More particularly, the invention relates to sulfonamides having the formula $$R_1-\text{C}_6\text{H}_4-SO_2\overset{R_2}{\underset{|}{N}}-\overset{R_3}{\underset{\underset{R_3}{|}}{C}}-(CH_2)_n NH(CH_2)_m(NH)_q(CH_2)_p$$

$$-\overset{R_3}{\underset{\underset{R_3}{|}}{C}}-\overset{R_2}{\underset{|}{N}}-SO_2-\text{C}_6\text{H}_4-R_4$$

(I)

wherein $R_1$ and $R_4$ are hydrogen, lower alkyl, halogen, e.g., chlorine or bromine, preferably chlorine, or amino; $R_2$ and $R_3$ are hydrogen or lower alkyl; $m$ is the natural number 0 or 2 to 4, inclusive; $q$ is the natural number 0 or 1, except that when either $m$ or $q$ is 0, then both $m$ and $q$ must be 0; and $n$ and $p$ are whole numbers from 1 to 3, inclusive, except that when $m$ and $q$ are 0, then $n$ and $p$ must each be at least 2; and when $R_3$ is lower alkyl, $m$ and $q$ must each be other than 0 and $n$ and $p$ must each be 1.

Preferred compounds of Formula I are those of Formulas II and III below:

$$R_1-\text{C}_6\text{H}_4-SO_2\overset{R_2}{\underset{|}{N}}-(CH_2)_r-NH(CH_2)_s-\overset{R_2}{\underset{|}{N}}-SO_2-\text{C}_6\text{H}_4-R_4$$

(II)

wherein $R_1$, $R_2$, and $R_4$ have the same meaning as in Formula I and $r$ and $s$ are each the whole number 3 or 4

$$R_5-\text{C}_6\text{H}_4-SO_2NH-\overset{R_3}{\underset{\underset{R_3}{|}}{C}}-(CH_2)_t-NH-(CH_2)_u-$$

$$NH-(CH)_{2v}-\overset{R_3}{\underset{\underset{R_3}{|}}{C}}-NH-\text{C}_6\text{H}_4-R_6$$

(III)

wherein $R_5$ and $R_6$ are hydrogen or lower alkyl; $R_3$ has the same meaning as in Formula I; $t$ and $v$ are each the whole number 1 or 2, except that when $R_3$ is lower alkyl, $t$ and $v$ must be 1; and $u$ is a whole number from 2 to 4, inclusive. Most preferably, $t$ and $v$ are the same number, and $R_5$ and $R_6$ are identical.

The term "lower alkyl" used herein is to be understood to mean a straight or branched chain alkyl group having from 1 to 7 carbon atoms, such as methyl, ethyl, isopropyl, hexyl, heptyl, etc.; with methyl preferred in all cases.

The compounds of the Formula I are prepared according to the following novel processes:
Reaction Scheme I
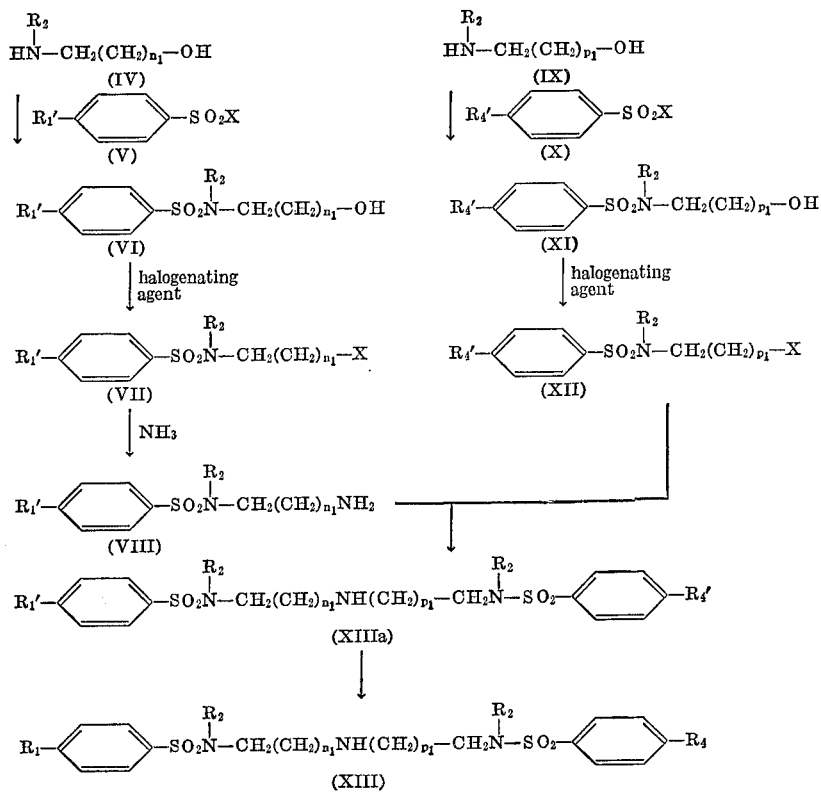
Reaction Scheme II
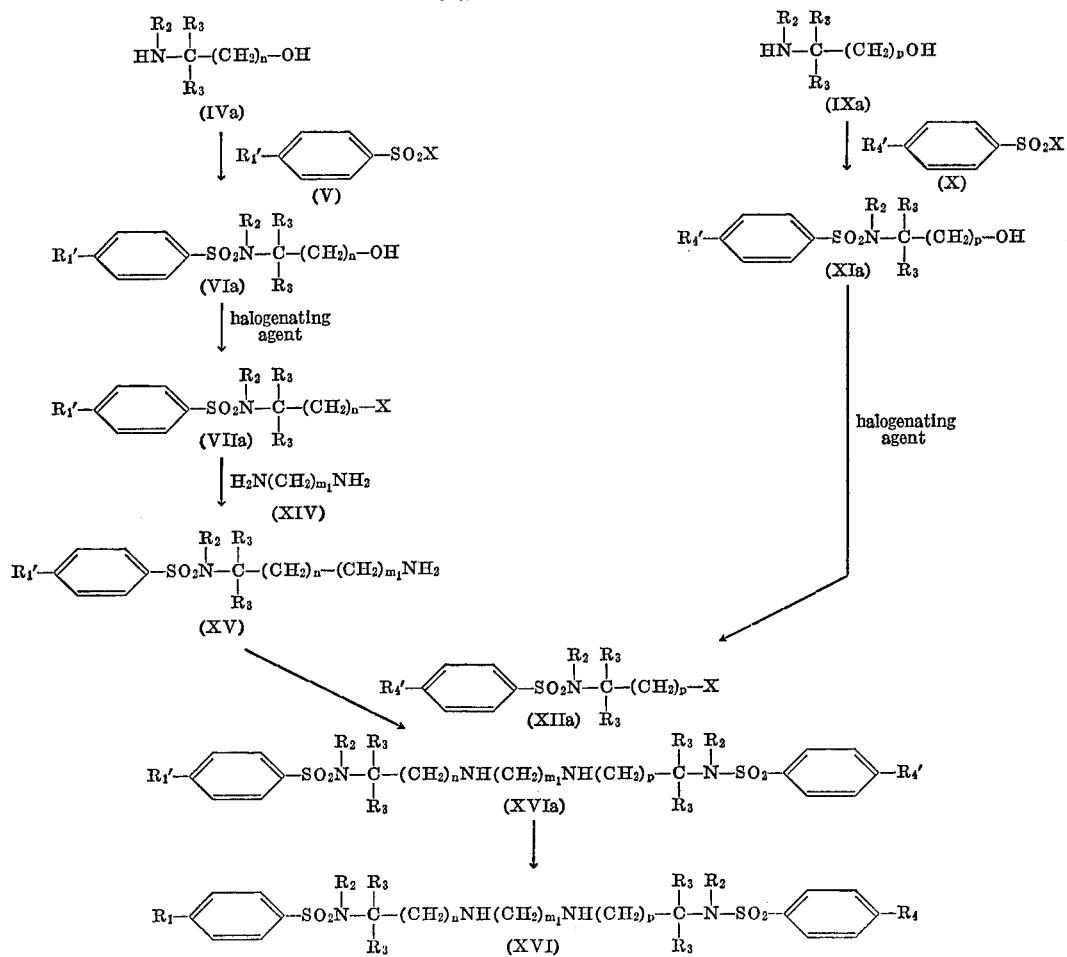

In the above reaction schemes $R_1'$ and $R_4'$ are hydrogen, lower alkyl or a protected amino group or an amino group precursor, e.g., a group which can be converted to an amino group through reduction or hydrolysis, for example, nitro, nitroso, azo, hydrazo, hydrazido, carbalkoxyamino, carbobenzyloxyamino group, etc., or preferably, an acylamido group, for example, an alkanoylamido, preferably a lower alkanoylamide, e.g., acetamido, propionylamido, etc., or benzamido, or substituted benzamido, e.g., alkyl or halosubstituted benzamido; X is chlorine or bromine; $m_1$ is a whole number from 2 to 4, inclusive; $n_1$ and $p_1$ are each 2 or 3; and $R_1$ to $R_4$ and $n$ and $p$ have the same meanings as given above.

The above Reaction Scheme I is carried out by reaction an alkanolamine of Formula IV with a phenyl sulfonyl halide of Formula V at a temperature in a range of from about 20 to about 150° to form a compound of Formula VI. The compound of Formula VI is then treated with a halogenating agent, e.g., thionyl chloride, phosphorus trichloride or tribromide, phosphorus pentachloride or pentabromide, to form a compound of Formula VII. The compound of Formula VII is then treated with ammonia, preferably in the presence of a lower alkanol, e.g., ethanol, at temperature in the range of from about 80 to about 160°, to form a compound of Formula VIII. Compound VIII is then reacted with a compound of Formula XII to form a compound of Formula XIIIa at a temperature of from about 60 to about 150° C., either in the absence of a solvent, or in the presence of an inert solvent, e.g., lower alkanols such as methanol, ethanol, etc., aromatic hydrocarbons such as benzene, toluene, etc., halogenated hydrocarobns having a boiling point above about 60° C., such as carbon tetrachloride, etc., or an excess of Compound VIII can be employed to act as a solvent and an acid binding agent. A preferred embodiment of the process is to employ Compound VIII in the form of a crystallized salt, e.g., a mineral acid salt such as the hydrochloride or sulfate, and add to the reaction mixture an approximately equivalent quantity of an alkali metal lower alcoholate in the corresponding alcohol to act as an acid binding agent. When either $R_1'$ or $R_4'$ or both are protected amino or amino group precursors, the resulting product containing $R_1'$ and/or $R_4'$ is converted into a compound of Formula XIII by the appropriate known reaction for obtaining an amino group from a protected amino or amino group precursor. For example, when $R_1'$ and/or $R_4'$ is an acylamido group, removal of the acyl group can be carried out by heating in an aqueous alkaline or acid medium. The compound of Formula XIII is a compound of Formula I wherein $m$ and $q$ are zero and $n$ and $p$ are 2 or 3.

The compound of Formula XII is obtained by the same process steps for obtaining compound VII except that compounds of Formulas IX and X are employed as the starting materials.

When it is desired to prepare the compound of Formula I wherein $m$ and $q$ are other than zero, i.e., a compound of Formula XVI, this is prepared according to Reaction Scheme II by reacting a compound of Formula VIIa prepared from compounds IVa and VIa according to the same procedure as in Reaction Scheme I for compounds IV, VI, and VII, with an excess of a diamine of Formula XIV at a temperature in the range of about 20 to about 150° C., either in the absence of a solvent, or in the presence of an inert solvent such as those given above for the reaction of compound VIII with compound XII to form a compound of Formula XV. The compound of Formula XV is then reacted with a compound of formula XIIa to form a compound of Formula XVIa, which is then converted, if required, into a compound of Formula XVI, as described above for converting a compound of Formula XIIIa wherein $R_1'$ and/or $R_4'$ are protected amino or amino group precursors. Compound XIIa is prepared from the reaction between compounds XIa and X to give compound XIa, and from compound XIa to compound XIIa, according to the procedure given above for preparing compound XII. When $n=p$ in the product of Formula XVI, then approximately two moles of compound VII are employed per mole of compound XIV to form directly a symmetrical compound of Formula XVIa wherein $n=p$ and $R_1'=R_4'$.

Compounds of Formulas IV, IVa, IX, and IXa wherein $R_2$ is hydrogen are known compounds. For example, compounds of Formulas IVa and IXa wherein $R_2$ is hydrogen, the $R_3$ groups are hydrogen or lower alkyl, and $n$ and $p$ are 1, are prepared according to the following reaction scheme:

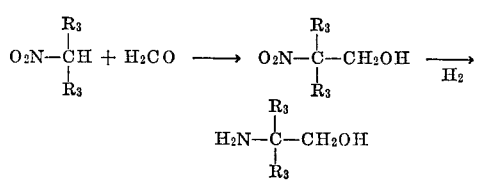

Compounds of Formulas IV, IVa, IX, and IXa wherein $R_2$ is lower alkyl are prepared as follows:

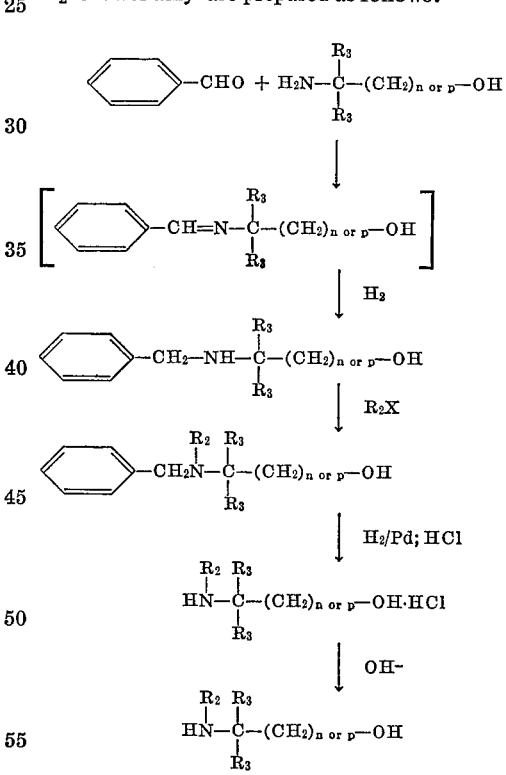

In the above reaction scheme $R_2$ is lower alkyl, $R_3$, $n$, and $p$ have the meanings given above, and X is halogen, preferably chlorine or bromine. The above reaction sequence is carried out by reacting benzaldehyde with a compound of the formula

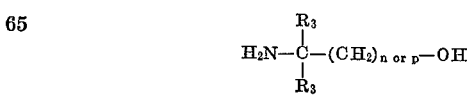

to form a compound of the formula

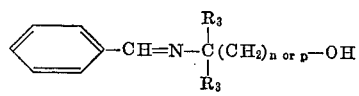

which can be isolated from the reaction mixture before hydrogenation, or can be hydrogenated in the reaction mixture. The hydrogenation to form a compound of the formula

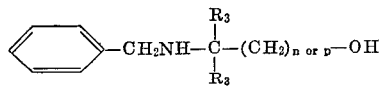

is carried out in the presence of a hydrogenation catalyst, e.g., a nickel catalyst. The above compound is then reacted with a lower alkyl halide, $R_2X$, to form a compound of the formula

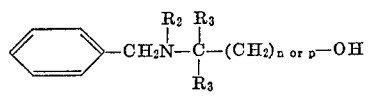

The latter compound is then hydrogenated in the presence of a mineral acid and a hydrogenation catalyst, e.g., a palladium catalyst, to form a mineral acid salt of a compound of Formulas IV, IVa, IX, or IXa, wherein $R_2$ is lower alkyl. The salt is treated with a base to form the free amine wherein $R_2$ is lower alkyl.

An alternate process can be employed for preparing compounds of Formula XVII

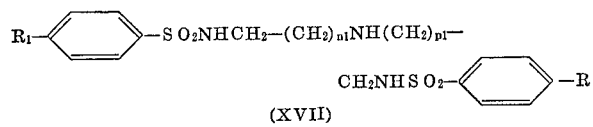

wherein $R_1$, $n_1$ and $p_1$ have the same meaning as given above.

The reaction scheme for preparing these compounds is given below:

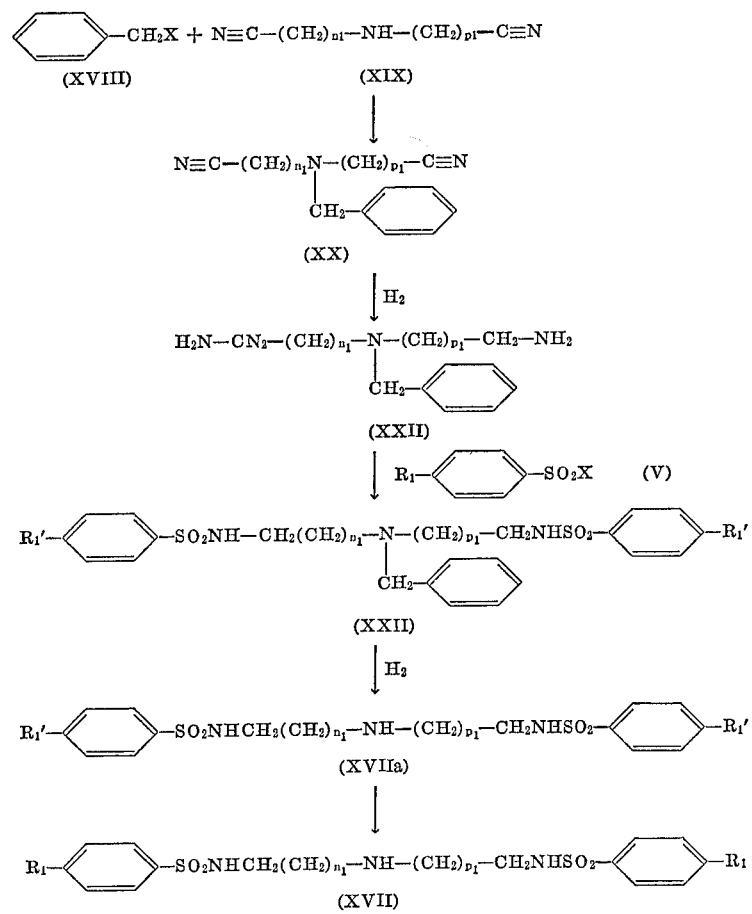

In the above reaction scheme X, $n_1$, $p_1$, $R_1'$ and $R_1$ have the meanings given above.

The above reaction scheme is carried out by reacting a benzyl halide of Formula XVIII with a compound of Formula XIX at a temperature in the range of from about 60° to about 160° in the presence of an inert solvent such as low molecular weight ketones, i.e., having up to about 6 carbon atoms, preferably acetone; dimethylformamide; or those given above for the reaction of Compound VIII with Compound XII, and in the presence of an acid binding agent, such as an alkali metal carbonate, e.g., sodium carbonate, or an excess of Compound XIX, to form a compound of Formula XX. The compound of Formula XX is then hydrogenated in the presence of a Raney cobalt or Raney nickel catalyst, preferably in the presence of a lower alkanol solvent, e.g., methanol, and in the presence of either a tertiary amine, e.g., a triloweralkylamine such as triethylamine, or in the presence of ammonia, at a temperature in a range of from about 60° to about 140° and hydrogen pressure of about 30 atmospheres to about 120 atmospheres to form a diamine of Formula XXI. The diamine of Formula XXI is then reacted with a compound of Formula V to form a compound of Formula XXII. The compound of Formula XXII is then hydrogenated in the presence of a mineral acid, e.g., hydrochloric acid, and in the presence of a palladium catalyst, preferably palladium on charcoal to form a compound of Formula XVIIa. The compound of Formula XVIIa is converted into a compound of Formula XVII, if required, as disclosed above for converting a compound of Formula XIIIa to a compound of Formula XIII. However, when $R_1'$ is a group convertible to an amino group by reduction, the above hydrogenation step (XXII to XVIIa) will usually convert the amino group precursor into amino directly.

The products of the invention of Formulas I, II, III, XIII, XVI, and XVII can be employed as such or in the form of their acid addition salts wtih pharmaceutically acceptable acids.

The compounds of Formulas I, II, III, XIII, XVI, and XVII, and their acid addition salts, have cardioactive properties and are useful in the prevention of myocardial necrosis and anoxic changes in the heart muscle. In addition, they are effective against tachycardia and arrhythmia in both auricular and ventricular tissues. They can be administered orally in doses ranging from about 2.5 to about 400 mg. per kg. of animal body weight and parenterally at doses of about 1 to about 50 mg. per kg. of animal body weight, with dosage adjusted to species and to individual requirements. The compounds of the invention are compatible with the usual pharmaceutical excipients and can be administered orally or by injection, e.g., intravenously, in combination with known formulation excipients commonly used for these dosage forms. For example, typical formulations are as follows for an acid addition salt of N,N'-(iminoditrimethylene)-di-p-toluene sulfonamide, which is the preferred compound of the invention.

Tablet formulation

| | Per tablet mg. |
|---|---|
| N,N(-(iminoditrimethylene)-di-p-toluene sulfonamide hydrochloride | 120.0 |
| Corn starch | 26.5 |
| Prehydrolyzed corn starch | 20.0 |
| Calcium stearate | 1.5 |

Procedure (1) N,N'-(iminoditrimethyene)-di-p-toluene sulfonamide hydrochloride, corn starch and prehydrolyzed corn starch were mixed in suitable size mixing equipment.

(2) the powder was granulated with distilled water to the consistency of a heavy paste.

(3) The heavy paste was spread on paper-lined trays and dried overnight at 110° F.

(4) The dried granulation was passed through a No. 20 screen and placed in suitable mixing equipment. The calcium stearate was added and mixed thoroughly.

(5) The mixture was compressed at 150 mg. per tablet, using punches having an approximate diameter of $^6/_{16}"$. The punches can be scored to facilitate half dosage.

Capsule formulation

| | Per capsule, mg. |
|---|---|
| N,N'-(iminoditrimethylene) - di - p - toluene sulfonamide hydrochloride | 252.5 |
| Lactose | 36.0 |
| Corn starch | 36.5 |
| Magnesium stearate | 5.0 |

Procedure (1) All of the ingredients were mixed until thoroughly blended in a suitable size container.

(2) The powder was filled into No. 2, two piece, hard shell gelatin capsules to an approximate fill weight of 330 mg. using a capsulating machine.

Parenteral formulation

| | Per cc. |
|---|---|
| N,N'-(iminoditrimethylene) - di - p - toluene sulfonamide hydrochloride | 25 mg. |
| Sodium hydroxide q.s. ad | ph 9.0 |
| Water for injection, U.S.P. q.s. ad | 1 cc. |

Procedure (1) N,N'-(iminoditrimethylene) - di - p - toluene sulfonamide hydrochloride was slurried in part of the water for injection.

(2) The drug was solubilized by slowly adding the sodium hydroxide as a 10 percent solution to a pH of approximately 9.0.

(3) The solution was filtered and allowed to stand for 24 hours. It was then filtered through an 02 Selas candle.

(4) The solution was then filled into desired size ampuls and sealed under an atmosphere of nitrogen.

(5) The ampuls were sterilized for 20 minutes at 250° F.

(6) All ampuls were inspected, and those with excessive amounts of fibers were rejected.

The invention will be better understood from a consideration of the following examples which are given for illustration purposes only and are not meant to limit the invention.

EXAMPLE 1

Preparation of N,N'-(iminoditrimethylene)-di-p-toluenesulfonamide hydrochloride 165 g. of 3-aminopropanol (2.2 m.) were placed in a 2-liter, three-neck flask, equipped with stirrer and thermometer. 190.5 g. (1 m.) of p-toluenesulfonylchloride was added thereto in small portions at such a rate that the rapidly rising temperature did not exceed 130° (20–30 minutes). The temperature of 130° was maintained for an additional 30 minutes and then the resulting syrup allowed to cool below 100°. After pouring into 1 liter of water, the precipitated water-insoluble oil was taken up by 3 extractions with 200 ml. each of ethyl acetate. The ethyl acetate layer was washed with water, dried, and finally evaporated in a vacuum. The residual oil, 3-p-toluenesulfonamidopropanol, 180 g. (79 percent), was transferred into a three-neck flask equipped with stirrer, reflux condenser and dropping funnel and immersed in a heatable water bath. Thionyl chloride, 134 g. (1.12 m.) was gradually added through the dropping funnel under stirring at 50–70°, at such a rate as the HCl and SO₂ evolution permitted. After termination of the addition, the mixture was heated for 2 hours to 90–100°. The reaction mixture was poured into ice water and allowed to solidify under stirring. The solid material (3-[p-toluenesulfonamido]propylchloride) was collected by filtration and obtained as a light brown powder melting in the crude state at 53°. The yield of 186 g. corresponded to 82 percent. To purify it, it was ground in a mortar with heptane and filtered by suction; yield, 175 g. (71 percent). A sample recrystallized from toluene-heptane melted at 54–55°.

100 g. (0.4 m.) of 3-p-toluenesulfonamidopropylchloride were heated in an autoclave with 1100 ml. of alcohol containing 68 g. of NH₃ for 5 hours to 150°. After allowing it to cool, the solution was filtered from precipitated ammonium chloride and evaporated in a vacuum (12–20 mm. pressure) as far as possible. The residue was acidified to a pH of 2–3 with concentrated hydrochloric acid and finally evaporated in a porcelain dish on a steam bath till it solidified to a crystalline mass upon chilling. The product was slurred with 150 ml. of cold water and filtered by suction. The filtrate was ground with ether, filtered by suction, and allowed to dry in the air. It was then boiled with 100 ml. of water containing 1 ml. of concentrated HCl in a beaker and the hot water solution decanted from the residual undissolved oil on the bottom of the bessel. The solution, upon chilling, gave a heavy crystallization of the product. The undissolved oil was extracted with hot acidified water in like manner and the process repeated till no further crystallization from the extract could be obtained. The combined crystallizations were once more recrystallized from isopropanol. There resulted 17 g. of N,N'-(iminoditrimethylene) - di - p - toluenesulfonamide hydrochloride melting at 183.5–184.5°.

The free base crystallized from dilute alcohol; melting point, 116° C.

EXAMPLE 2

Preparation of N,N'-(iminotetramethylenetrimethylene) bis-(p-toluenesulfonamide) hydrochloride 84 g. of sodium iodide, 124 g. of 3-p-toluenesulfonamidopropylchloride and 500 ml. of acetone were refluxed under stirring for 10 hours. The reaction mixture was poured into 2.5 liters of ice water. The oily precipitate crystallized rapidly upon seeding. The solid (3-p-toluenesulfonamidopropyliodide) was collected by filtration, ground in a mortar with cold water and filtered again. It formed a tan crystalline powder melting at 49–54° and was used in this state for subsequent reactions. A sample recrystallized for benzene-heptane formed colorless plates; melting point 55–57°. The yield of crude material amounted to 148 g., corresponding to 87 percent of the theory.

68 g. of p-toluenesulfonamidopropyliodide, 680 ml. of alcohol and 14 g. of potassium cyanide were refluxed under stirring for 20 hours. The solvent was evaporated in vacuo, 200 ml. of water were added to the residue and the undissolved material extracted with 300 ml. of ether. The ether extract was washed twice with water, then charcoaled. The ether was evaporated and the oily residue allowed to crystallize in a vacuum desiccator. The residue (4-p-toluenesulfonamidobutyronitrile) solidified slowly to a white solid mass melting at 47–50°. The yield of 45 g. corresponded to 95 percent of the theory.

82 g. of p-toluenesulfonamidobutyronitrile in 1200 ml. of ethanol were hydrogenated with 13 g. of Raney cobalt in the presence of 13 g. of triethylamine at a pressure of 750 lbs. and a temperature of 70–80° during 5 hours. The solvent was evaporated in a vacuum to a syrup. The residue, upon standing, deposited some crystalline material which was recovered after slurrying with isopropanol. The filtrate was neutralized with hydrochloric acid upon which another crop of the crystalline byproduct remained undissolved.

The filtrate was evaporated to dryness in vacuo and the residue [N - (4 - aminobutyl) - p - toluenesulfonamide hydrochloride], which in the course of several hours crystallized, was recrystallized from isopropanol. The yield of 40–45 g. corresponded to 43–47 percent; melting point, 107–108°.

20 g. (0.072 m.) of N - (4 - aminobutyl) - p - toluenesulfonamide hydrochloride were added to sodium ethoxide prepared from 1.65 g. of sodium in 50 ml. of alcohol and 24.4 g. of 3-(p-toluenesulfonamidopropyliodide), prepared above, were added. The mixture was refluxed for 4 hours, poured into 100 ml. of ice water and rendered slightly alkaline with 10 ml. of concentrated ammonia. The precipitated oil was extracted with 100 ml. of ethyl acetate. The ethyl acetate layer was washed twice with 50 ml. of water for each washing. An oxalate of the product was precipitated by the addition of 8 g. of oxalic acid (anhydrous) dissolved in 200 ml. of ethyl acetate. The oxalate crystallized gradually in voluminous needle aggregates. After allowing to stand in a refrigerator for 24 hours, it was collected by filtration by suction and recrystallized from 65 ml. of ethanol (20 g.). In order to transform it into the hydrochloride, it was heated with 100 ml. of 3 N aqueous hydrochloric acid. The hydrochloride [N,N' - (iminotetramethylenetrimethylene)bis-(p-toluenesulfonamide) hydrochloride] which first separated as an oil, crystallized in the course of 24 hours. It was filtered by suction and obtained in a yield of 14 g. corresponding to 40 percent of the theory; melting point, 132–134°; melting point of the free base, 93–95°.

EXAMPLE 3

Preparation of N,N'-(dimethylenediiminoditrimethylene) bis-(p-toluenesulfonamide) dihydrochloride 6.0 g. of ethylenediamine (anhydrous) were added to 68 g. of p-toluenesulfonamidopropyliodide. The temperature rose spontaneously to 85° and a homogeneous mixture resulted. It was heated to 95–100° on a steam bath for 30 minutes. The thick syrup was heated hereafter with 100 ml. of water and 20 ml. of concentrated ammonia. The aqueous layer was decanted from the heavy oil and the latter washed again 3 times with 100 ml. of water. It was then dissolved in 50 ml. of alcohol and the solution acidified with alcoholic hydrochloric acid. The hydrochloride of the product, N,N' - (dimethylenediiminoditrimethylene)bis-(p - toluenesulfonamide) dihydrochloride, crystallized slowly by allowing to stand in the refrigerator overnight. It was filtered by suction (22 g.; melting point 225–228°) and recrystallized from about 1 liter of water. The yield of pure product, melting point 243°, amounted to 15 g. (27 percent of the theory). The free base (from isopropanol) melted at 128°.

EXAMPLE 4

Preparation of N,N'-(trimethylenediiminoditrimethylene) bis-[p-toluenesulfonamide] dihydrochloride 68 g. of p-toluenesulfonamidopropyliodide were added gradually to 7.4 g. of 1,3-propanediamine. The temperature rose to 100–105°. After maintaining the temperature at 100° for 30 minutes on a steam bath, the resinous product was slurred at 70–80° with 100 ml. of water, 10 ml. of aqueous concentrated ammonia and 150 ml. of ethyl acetate and 5 ml. of ethanol. The organic layer was separated and the product, N,N'-(trimethylenediiminoditrimethylene)bis - [p - toluenesulfonamide], precipitated from it in the form of a crystallized oxalate by the addition of a solution of 20 g. of anhydrous oxalic acid in 270 ml. of ethyl acetate. The oxalate crystallized in voluminous needle aggregates. It was filtered by suction and recrystallized from 600–700 ml. of water. In order to transform it into the hydrochloride, it was slurred with 10 ml. of concentrated hydrochloric acid plus 20 ml. of water until it crystallized again, and finally recrystallized from 100 ml. of methanol containing a little anhydrous HCl. The hydrochloride melted at 215–216° and was obtained pure in a yield of 14 g. (24 percent). The free base crystallized from alcohol and melted at 170–171°.

EXAMPLE 5

Preparation of N,N'-(tetramethylenediiminoditrimethylene)bis-[p-toluenesulfonamide] dihydrochloride The compound was prepared in a manner analogous to N,N' - (trimethylenediiminoditrimethylene)bis - [p-toluenesulfonamide] dihydrochloride from 68 g. of p-toluenesulfonamidopropyliodide and 8.6 g. of putrescine. The oxalate was recrystallized from methanol and obtained in a yield of 44 g. It gave with 15 ml. of water plus 30 ml. of concentrated hydrochloric acid 18 g. of pure hydrochloride of melting point 268–270° (31 percent of the theory).

EXAMPLE 6

Preparation of N,N'-[ethylenediimino-bis-(2,2-dimethylethylene)]-bis-(p-toluenesulfonamide) dihydrochloride 392 g. (4.4 moles) of 2-amino-2-methyl-1-propanol (practical grade) was placed in a round bottom flask of 2 liters equipped with stirrer, heating mantle and thermometer and 381 g. (2.0 moles) of p-toluenesulfonylchloride was added in portions at such a rate that the rapidly rising temperature did not exceed 130–140°, which took about 20–25 minutes. The temperature was maintained at 130° for an additional 45 minutes. The reaction mixture was allowed to cool to 100° and then poured into 3 liters of cold water under stirring. The oily precipitate solidified rapidly. It was filtered by suction and washed on the filter with 2 liters of water. It was dried first at room temperature, then in an oven at 60°. The yield of 402 g. of 2-(p-toluenesulfonamido)propanol corresponded to 83 percent of the theory. The melting point was 95–96°. A sample, recrystallized from isopropanol, melted at 98–99°.

402 g. (1.66 moles) of 2-(p-toluenesulfonamido)propanol was placed in a 2-liter flask equipped with stirrer, thermometer, heating mantle and reflux condenser and heated to 95–100° till the material was molten. 300 g. (2.5 moles) of thionyl chloride was dropped into the stirred material at 95–100° at such a rate as the evolution of HCl and SO$_2$ would allow. It was kept at 95–100° for 5 hours when the evolution of HCl had ceased and then poured into 1.5 liters of ice water. The product, 2-(p-toluenesulfonamido)-2-methylpropylchloride, precipitated as a sand colored, crystalline powder which was collected on a filter by suction. A sample recrystallized from isopropanol melted at 98–99°. The yield of 250 g. corresponded to 58 percent of the theory.

52 g. of 2 - (p - toluenesulfonamido) - 2 - methylpropylchloride (0.2 mole) was added in portions to 6.0 g. (0.1 mole) of ethylenediamine. The mixture was heated to 95–100° for 45 minutes on a steam bath and 10 minutes to 140–155°. After allowing to cool to 100°, 100 ml. of water, 20 ml. of aqueous 25 percent ammonia and 200 ml. of ethyl acetate were added to the thick syrup. The aqueous layer was separated and discarded. The ethyl acetate layer was washed 3 times with 50 ml. of water and dried over $K_2CO_3$.

An oxalate was precipitated by the addition of a solution of 20 g. of anhydrous oxalic acid in 250 ml. of ethyl acetate and after allowing to stand at 0.5° overnight, it was filtered by suction. To purify the material, it was slurried with 100 ml. of water and 25 ml. of alcohol at 70°, allowed to cool and filtered by suction. The filter cake was washed on the filter with 100 ml. of alcohol.

In order to obtain the crystallized hydrochloride, it was dissolved in 90 ml. of 3 N aqueous hydrochloric acid. Upon cooling, the hydrochloride, N,N'-[ethylenediiminobis - (2,2 - dimethylethylene)]bis-(p-toluenesulfonamide) dihydrochloride, crystallized. It was recrystallized from 200 ml. of water.

There was obtained 4.3 g. (7.4 percent) of pure hydrochloride melting at 260–261°.

EXAMPLE 7

Preparation of N,N'-[trimethylenediimino - bis - (2,2 - dimethylethylene)] - bis - (p - toluenesulfonamide) dihydrochloride 52 g. of 2-(p-toluenesulfonamido)propylchloride (0.2 mole) was added in portions to 7.4 g. (0.1 mole) of 1,3-diaminopropane. The temperature rose to 130°. It was maintained at 130° for 10 minutes and then on a steam bath for an additional hour at 100°. The reaction mixture was treated with dilute ammonium hydroxide and the resulting free base taken up in a total of 200 ml. of ethyl acetate. The extract was washed with water (3× 50 ml.) dried briefly over anhydrous sodium sulfate, and then filtered through a layer of activated charcoal.

An oxalate was precipitated by the addition of a solution of 20 g. of anhydrous oxalic acid dissolved in 250 ml. of ethyl acetate.

The crystalline hydrochloride was obtained by dissolving the oxalate in 80 ml. of 3 N aqueous hydrochloric acid. After recrystallization from diluted hydrochloric acid, the hydrochloride was obtained as a hydrate which lost its water of crystallization upon azeotropic drying in toluene; yield, 7.5 g.; melting point, 247° (d). (12.5 percent of the theory).

EXAMPLE 8

Preparation of N,N'-(ethylenediiminoditrimethylene) bis-(p-tert.butylbenzenesulfonamide) dihydrochloride To 3-aminopropanol (78 g.; 1.03 m.) was added p-tert. butylbenzenesulfonyl chloride (110 g.; 0.47 m.) at such a rate as to keep the temperature at 100–110°. After keeping the reaction mixture at 100° for ½ hour, it was poured into cold water and the condensation product extracted with ethyl acetate (400–500 ml.). The solvent was taken off in a vacuum and the crude liquid condensation product (127 g.; 0.47 m.) was heated for 4 hours with thionyl chloride (84 g.; 0.70 m.). After pouring the reaction mixture on ice, crude p-tert. butylbenzenesulfonamidopropyl chloride crystallized, yielding 127 g. (93.5 percent of the theory). Recrystallized from a mixture of benzene and heptane, it melted at 83–84°.

Sodium iodide (67 g.; 0.446 m.) was dissolved in acetone (400 ml.), p-tert. butylbenzenesulfonamidopropyl chloride (118 g.; 0.408 m.) was added and the reaction mixture refluxed for 10 hours. After pouring the reaction mixture into cold water, the condensation product crystallized, yielding 140 g. (90 percent of the theory) of crude p-tert. butylbenzenesulfonamidopropyl iodide. Recrystallized from heptane, it melted at 113°.

Eethylenediamine (6 g.; 0.1 m.) was added to p-tert. butylbenzenesulfonamidopropyl iodide (76 g.; 0.2 m.). The reaction mixture was then heated at 100° for ½ hour resulting in a homogeneous syrupy mass. On heating with water (100 ml.) and aqueous $NH_4OH$ (30 ml.), the free base was obtained as a reddish heavy oil. It was triturated a few times with warm water, taken up in ethanol (100 ml.) and then precipitated as hydrochloride through addition of alcoholic HCl to the solution. On recrystallization from water, the substance, N,N'-(ethylenediiminoditrimethylene)bis-(p-tert. butylbenzenesulfonamide) dihydrochloride, melted at 270–271°. Yield: 19 g.

EXAMPLE 9

Preparation of 4-tert. butyl-N,N'-(iminoditrimethylene)-4'-methyldibenzenesulfonamide hydrobromide Sodium (2.3 g.; 0.1 at.) was dissolved in absolute alcohol (100 ml.). To the solution, N-(3-aminopropyl)-p-toluenesulfonamide hydrochloride (26.5 g.; 0.1 m.) was added, followed by p-tert. butylbenzenesulfonamidopropyl iodide (38 g.; 0.1 m.). The reaction mixture was then refluxed for 5 hours. After cooling to room temperature, the reaction mixture was poured into water (1000 ml.) and the solution made alkaline with aqueous $NH_4OH$. The free base, which precipitated as a thick oil, was taken up in ethyl acetate (450 ml.), the extract washed with water (2× 100 ml.) and briefly dried over $Na_2SO_4$.

The oxalate was then precipitated by addition of anhydrous oxalic acid (10 g.; 0.11 m.) dissolved in ethyl acetate (125 ml.) to the solution of the base in ethyl acetate. The white, voluminous precipitate was collected and then recrystallized from water (100 ml.).

The hydrobromic salt of the base was obtained by treating the oxalate above with aqueous hydrobromic acid (48 percent; 20 ml.) as a tan colored crystalline mass. On recrystallization from isopropanol, the substance, 4-tert. butyl-N,N'-(iminoditrimethylene) - 4'-methyldibenzenesulfonamide hydrobromide, melted at 171–172°. Yield: 10 g.

EXAMPLE 10

Alternate preparation of N,N'-(iminoditrimethylene)di-p-toluenesulfonamide hydrochloride To a 5-liter, 3-neck round bottom flask, equipped with stirrer, reflux condenser and heating mantle were charged 246 g. (2.0 mol.) of 3,3'-iminodipropionitrile, 254 g. (2.0 mol.) of benzyl chloride and 240 g. (1.74 mol.) of potassium carbonate in 2 liters of ethanol. The reaction mixture was stirred and refluxed for 24 hours. The mixture was cooled to room temperature, the solids were filtered and washed 3 times with 500 cc. portions of ethanol. The solvent was evaporated in vacuo and the residue was treated successively with 200 cc. of 40 percent sodium hydroxide solution, 2 liters of water, and 1 liter of ether. The organic layer was separated and the aqueous layer was extracted twice with 500 cc. portions of ether. The combined ether extracts were washed 3 times with 500 cc. portions of water, dried with anhydrous sodium sulfate, filtered and evaporated in vacuo to yield 426 g. of crude 3,3'-benzyliminodipropionitrile.

To 48 g. (0.225 mol.) of crude 3,3'-benzyliminodipropionitrile was added a solution of 42.7 g. (0.225 mol.) of p-toluenesulfonic acid monohydrate in 70 cc. of hot ethanol. The mixture was cooled to room temperature and ether was added to the appearance of a faint turbidity (100 cc.). After cooling in an ice bath the resulting solid was filtered and dried in a vacuum oven at 60° to yield 43.5 g. (50 percent) of 3,3'-benzyliminodipropionitrile-p- toluenesulfonate; melting point, 132–135°. 3,3'-benzyliminodipropionitrile-p-toluenesulfonate (43.5 g., 0.113 mol.) was treated with 100 cc. of methylene chloride, 100 cc. of water and 50 cc. of 10 percent sodium hydroxide solution. The aqueous layer was separated and extracted three times with 50 cc. portions of methylene chloride. The combined methylene chloride extracts were washed once with 100 cc. of water, dried over sodium sulfate and evaporated to yield 23 g. (96 percent recovery from salt) of product, pure 3,3'-benzyliminodipropionitrile; $n_D^{21}$=1.5235.

To 80 g. (0.376 mol.) of N-benzyliminodipropionitrile were added 40 g. of triethylamine and 40 g. of Raney cobalt catalyst. The mixture was diluted to 600 cc. total volume with ethanol in a glass hydrogenation liner. The mixture was hydrogenated at 90–100° at an initial pressure of 1200 lbs. The pressure drop was 330 lbs. of hydrogen (theory, 315 lbs.). The autoclave was allowed to cool to room temperature, the catalyst was filtered and washed well with ethanol. The solution was evaporated in vacuo to give 83 g. of crude product, N,N'-bis-(3-aminopropyl)benzylamine.

To 27 g. (0.124 mol.) of crude N,N'-bis-(3-aminopropyl)-benzylamine dissolved in 300 cc. of methylene chloride were added simultaneously 47 g. (0.248 mol.) of p-toluenesulfonyl chloride dissolved in 200 cc. of methylene chloride and 120 cc. of 10 percent sodium hydroxide at 20–25° over a period of 30 minutes. The reaction mixture was stirred one hour longer at room temperature. The organic layer was separated and the aqueous phase was extracted twice with 200 cc. portions of methylene chloride. The combined methylene chloride extracts were washed with two portions of 500 cc. of water, dried with anhydrous sodium sulfate, filtered, and evaporated in vacuo to yield 71 g. (0.124 mol.) of crude free base. To the oil, dissolved in 100 cc. of hot ethanol, was added a solution of 23.6 g. (0.124 mol.) of p-toluenesulfonic acid monohydrate in 40 cc. of hot ethanol. After the solution was cooled to room temperature, ether (50 cc.) was added to the appearance of a faint turbidity. After crystallization at room temperature was complete, the mixture was cooled in an ice bath. The solid was filtered, washed with ether and dried in a vacuum oven at 80° to yield 48 g. (60 percent of theory) of product, N,N' - (benzyliminoditrimethylene)bis - p - toluene-sulfonamide p-toluenesulfonate; melting point, 168–170°.

N,N'-(benzyliminoditrimethylene)bis - p - toluenesulfonamide p-toluenesulfonate (48 g., 0.069 mol.) was partitioned between a mixture of 300 cc. of methylene chloride, 50 cc. of 100 percent NaOH, and 100 cc. of water. The methylene chloride layer was separated and the aqueous phase was extracted twice with 200 cc. portions of methylene chloride. The combined methylene chloride extracts were washed three times with 100 cc. portions of water, dried with anhydrous sodium sulfate, filtered, and concentrated to dryness in vacuo. The residue was dissolved in 100 cc. of ethanol, acidified with 20 cc. of 8.5 N methanolic hydrogen chloride and ether (20 cc.) was added to the appearance of a faint turbidity. Crystallization was allowed to take place at room temperature. The mixture was then cooled in an ice-water bath, filtered, washed with ether, and dried in a vacuum oven at 80° to yield 39 g. (100 percent) of N,N'-(benzyliminoditrimethylene)bis-p-toluenesulfonamide hydrochloride; melting point, 155–156°.

N,N'-(benzyliminoditrimethylene) - di - p - toluenesulfonamide hydrochloride (95 g., 0.168 mol.) was dissolved in 600 cc. of hot ethanol and 20 cc. of water. The solution was cooled to room temperature and hydrogenated at room temperature in a 1200 cc. glass liner with 30 g. of 10 percent palladium on charcoal at an initial pressure of 50 p.s.i. The hydrogen uptake was 28 lbs. The catalyst was filtered and washed with ethanol. The solution was concentrated in vacuo until crystals started to form. After cooling, the crystals were filtered, washed with ethanol, and dried at 80° in a vacuum oven to yield 56 g. (70 percent) of product, N,N'-(iminoditrimethylene) - di - p - toluenesulfonamide hydrochloride; melting point 183–185°. Concentration of the mother liquor gave an additional 5 g. of slightly less pure material; melting point 180–182°.

EXAMPLE 11

Preparation of N',N'-(iminoditrimethylene)disulfanilamide trihydrochloride

The Schotten-Baumann reaction was carried out according to the procedure described in Example 10. From 48 g. (0.217 mol.) of crude N,N'-bis-(3-aminopropyl) benzylamine in 350 cc. of methylene chloride, 96 g. (0.434 mol.) of p-nitrobenzenesulfonyl chloride in 300 cc. methylene chloride, and 174 cc. of 10 percent sodium hydroxide solution, there was obtained 136 g. (0.217 mol.) of crude base. To the crude base, dissolved in 150 cc. of ethyl aetate, was added 40 g. (0.217 mol.) of p-toluenesulfonic acid monohydrate dissolved in 150 cc. of ethyl acetate. After cooling in an ice bath the solid product N,N'-(benzyliminoditrimethylene) - bis - (p - nitrobenzenesulfonamide) p-toluenesulfonate was filtered. Yield, 55 g. (40 percent; melting point, 100–102°).

To 15 g. (0.197 mol.) of N,N'-(benzyliminoditrimethylene)-bis-[p-nitrobenzenesulfonamide] p-toluenesulfonate were added 150 cc. of ethanol, 8 cc. of 8.5 N methanolic hydrogen chloride, and 5 g. of 10 percent palladium on charcoal. The mixture was debenzylated and the nitro group reduced at room temperature in a Parr low-pressure hydrogenation apparatus at an initial pressure of 50 p.s.i. The hydrogen uptake which ceased after 1 hour, amount to 90 percent of theory. After filtering the catalyst, the solvent was evaporated. The residue was dissolved in water and basified with 10 percent sodium hydroxide solution. The aqueous layer was decanted from the precipitated oil which was then washed twice with 150 cc. of water. The oil was dissolved in acetonitrile and acidified with 70 cc. of 8.5 N methanolic hydrogen chloride to obtain 9 g. (83 percent) of product, N',N'-(iminoditrimethylene)-disulfanilamide trihydrochloride; melting point, 237–239° dec.

EXAMPLE 12

Preparation of N,N'-(iminoditrimethylene)bis-[p-chlorobenzenesulfonamide] hydrochloride The Schotten-Baumann reaction was carried out according to the procedure described in Example 10. From 29 g. (0.131 mol.) of crude N,N'-bis(3-aminopropyl)benzylamine in 100 cc. of methylene chloride, 55.5 g. (0.262 mol.) of p-chlorobenzenesulfonyl chloride in 200 cc. of methylene chloride and 115 cc. of 10 percent sodium hydroxide, there was obtained 77 g. (0.131 mol.) of crude base.

The crude base was converted to the p-toluenesulfonate salt according to the procedure described in Example 10. From 77 g. (0.131 mol.) of free base in 200 cc. of ethanol and 25.6 g. (0.131 mol.) of p-toluenesulfonic acid monohydrate in 40 cc. of ethanol there was obtained 48.2 g. (50 percent) of product, N,N'-(benzyliminoditrimethylene)bis - (p - chlorobenzenesulfonamide) p-toluenesulfonate, melting 156–159°.

N,N' - (benzyliminoditrimethylene)bis - (p - chlorobenzenesulfonamide) p-toluenesulfonate (34 g., 0.046 mol.), was converted to 25 g. (0.046 mol.) of free base according to the procedure described in Example 10.

Debenzylation of the base was accomplished in the same manner as described in Example 10. From 25 g. (0.046 mol.) of the base dissolved in 100 cc. of ethanol, 15 cc. of 8.5 N methanolic hydrogen chloride and 2 g. of 10 percent palladium on charcoal, there was obtained 14 g. (60 percent) of product, N,N'-(iminoditrimethylene)bis-(p - chlorobenzenesulfonamide) hydrochloride; melting point, 181–182°.

EXAMPLE 13

Preparation of N,N'-(iminoditrimethylene)bis-(benzenesulfonamide) hydrochloride

The Schotten-Baumann reaction was carried out according to the procedure in Example 10. From 48 g. (0.217 mol.) of crude N,N'-bis-(3-aminopropyl)benzylamine in 350 cc. of methylene chloride, 88 g. (0.434 mol.) of benzenesulfonyl chloride in 300 cc. of methylene chloride and 200 cc. of 10 percent sodium hydroxide solution, there was obtained 128 g. (0.248 mol.) of crude base.

The crude base was converted to the p-toluenesulfonate salt according to the procedure described in Example 10. From the 128 g. (0.248 mol.) of crude base in 200 cc. of ethanol and 47 g. (0.248 mol.) of p-toluenesulfonic acid in 100 cc. of ethanol, there was obtained 66.6 g. (41 percent) of N,N'-(benzyliminoditrimethylene)bis-(benzenesulfonamide) p-toluenesulfonate; melting point, 150–155°.

N,N' - (benzyliminoditrimethylene)bis-([ benzenesulfonamide] p-toluenesulfonate, (29 g., 0.043 mol.), was converted to 21.5 g. (0.043 mol.) of base by the procedure described in Example 10.

Debenzylation of the crude base was accomplished in the same manner as described in Example 10. From 21.5 g. (0.043 mol.) of base dissolved in 100 cc. of ethanol, 15 cc. of 8.5 N methanolic hydrogen chloride and 4 g. of 10 percent palladium on charcoal, there was obtained 10 g. (52 percent) of product, N,N'-(iminoditrimethylene)bis - [benzenesulfonamide] hydrochloride; melting point, 160–165°.

EXAMPLE 14

Preparation of N,N'-(iminoditrimethylene)bis-[N-methyl-p-toluenesulfonamide] hydrochloride N,N' - (benzyliminoditrimethylene)bis - p - toluenesulfonamide hydrochloride, (22.6 g., 0.040 mol.) was dissolved in 70 cc. of 10 percent sodium hydroxide solution. Dimethylsulfate (11.1 g., 0.088 mol.) was added dropwise over a period of 15 minutes at 20–25° and the solution was then allowed to stir an additional 17 hours at room temperature. The oil which had formed was dissolved in 150 cc. of methylene chloride and separated from the aqueous layer which was extracted twice with 100 cc. portions of methylene chloride. The combined methylene chloride extracts were washed twice with 100 cc. portions of water, dried over anhydrous sodium sulfate, filtered, and evaporated in vacuo to yield 22.3 g. of crude base.

The 22.3 g. of crude base was debenzylated in 100 cc. of ethanol, 5 cc. of 8.5 N methanolic hydrogen chloride and 4 g. of 10 percent palladium on charcoal according to the procedure described in Example 11, to yield 9 g. of product, N,N'-(iminoditrimethylene)bis-[N-methyl-p-toluenesulfonamide] hydrochloride; melting point 160–166°.

N,N' - (iminoditrimethylene)bis - [N - methyl - p - toluenesulfonamide] hydrochloride (5 g., 0.01 mol.) was converted to 4.7 g. of base by the procedure described in Example 10. To a solution of 4.7 g. of base in 50 cc. of ethanol was added 10 cc. of 1 N nitric acid solution. Ether (10 cc.) was added to the appearance of a faint turbidity. The crystals, which formed upon chilling, were filtered to yield 4 g. (75 percent) of N,N'-(iminoditrimethylene)bis-[N-methyl - p - toluenesulfonamide] nitrate; melting point, 152–153°.

EXAMPLE 15

Preparation of 4-chloro-4'-methyl-N,N'-(iminoditrimethylene)-benzenesulfonamide hydrochloride The Schotten-Baumann reaction was carried out exactly as described in Example 10. From 75 g. (1.0 mol.) of 3-propanolamine in 400 cc. of methylene chloride, 211 g. (1.0 mol.) of p-chlorobenzenesulfonyl chloride in 600 cc. of methylene chloride and 400 cc. of 10 percent sodium hydroxide solution, there was obtained, after crystallization from 500 cc. of methylene chloride, 226 g. (91 percent) of N-(2-hydroxypropyl)-p-chlorobenzenesulfonamide; melting point, 88–90°.

To a 250 cc., 3-neck, round-bottom flask equipped with a stirrer, a reflux condenser, a dropping funnel, and a calcium chloride drying tube was charged 32.6 g. (0.131 mol.) of N-(3-hydroxypropyl)-p-chlorobenzenesulfonamide. Thionyl chloride, (15 cc., 0.16 mol.) was added gradually with stirring over a period of 15 minutes. After the addition was complete, the mixture was heated for 2 hours on a steam bath. At the end of this period, the excess thionyl chloride was evaporated in vacuo on a steam bath. Ice water was then added to the residue which was allowed to solidify with stirring. The solids were filtered and washed with 500 cc. of water followed by 500 cc. of petroleum ether (boiling point, 30–60°) to obtain 34 g. (98 percent) of crude N-(3-chloropropyl)-p-chlorobenzenesulfonamide; melting point 48–51°.

To a 250 cc., 3-neck, round-bottom flask equipped with a stirrer and a reflux condenser were charged 26.8 g. (0.1 mol.) of crude N-(3-chloropropyl)-p-chlorobenzenesulfonamide, 15 g. (0.1 mol.) of sodium iodide and 100 cc. of acetone. The mixture was stirred and refluxed on a steam bath for 14 hours. The solids were filtered and the solvent was evaporated in vacuo. The residue was stirred with 250 cc. of ice water until solidification occurred. The solids were filtered, washed with 500 cc. of water, and then with 500 cc. of petroleum ether (boiling point, 30–60°) to obtain 28 g. (78 percent) of crude N-(3'-iodopropyl) - p - chlorobenzenesulfonamide; melting point, 60–63°.

To a 500 cc., 3-neck, round-bottom flask equipped with a stirrer, a reflux condenser and a heating mantle were charged 27.5 g. (0.077 mol.) of crude N-(3-iodopropyl)-p-chlorobenzenesulfonamide, 20.2 g. (0.077 mol.) of N-(3-aminopropyl) - p - toluenesulfonamide hydrochloride (prepared in Example 1), 21 g. (0.15 mol.) of potassium carbonate and 200 cc. of ethanol. The mixture was refluxed for 14 hours after which time the reaction was cooled to room temperature and filtered over a pad of HYFLO. The filtrate was evaporated in vacuo. The residue was partitioned between 200 cc. of water and 100 cc. of methylene chloride and the aqueous layer was extracted twice with 100 cc. of methylene chloride. The combined methylene chloride extracts were washed twice with 75 cc. of water, dried over anhydrous sodium sulfate, filtered, and evaporated in vacuo. The residue was dissolved in 100 cc. of ethanol and acidified with 15 cc. of 8.5 N methanolic hydrogen chloride. Ether (25 cc.) was added to the appearance of a faint turbidity. The crystals, which appeared on chilling, were filtered to yield 20 g. (53 percent) of 4-chloro-4'-methyl-N,N'-(iminoditrimethylene)benzenesulfonamide hydrochloride; melting point 180–190°.

We claim:

1. A compound of the formula

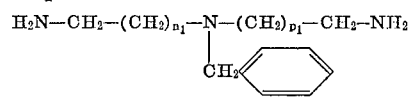

wherein $n_1$ and $p_1$ are whole numbers from 2 to 3.

2. A compound according to claim 1, N,N¹-bis-(3-aminopropyl)-benzylamine.

References Cited

Iiyame et al.: "Kogyo Kagaken Zaski," vol. 68(I), 232–42 (1965).

ROBERT V. HINES, Primary Examiner

U.S. Cl. X.R.

260—397.7, 465, 456.5, 556, 570.9; 424—228, 321